United States Patent

[11] 3,633,265

[72] Inventors: Vitaly Petrovich Lyashenko, ulitsa Batumskaya, 36, kv. 45; Gennady Nikolaevich Kuvaev, ulitsa Furmanova, 2, kv. 9.; Boris Petrovich Baglei, ulitsa Noginskaya, 43, kv. 5, all of Dnepropetrovsk, U.S.S.R.
[21] Appl. No.: 20,739
[22] Filed: Mar. 18, 1970
[45] Patented: Jan. 11, 1972

[54] METHOD OF SECURING SPIRAL-LAY WIRE ROPES IN TAPERED SOCKET
2 Claims, 7 Drawing Figs.

[52] U.S. Cl............................................. 29/461, 29/520, 24/122.6, 24/126 C
[51] Int. Cl............................................. B23p 25/00
[50] Field of Search............................................. 29/461, 517, 520; 24/126 C, 126 L, 122.6

[56] References Cited
UNITED STATES PATENTS

| | | | |
|---|---|---|---|
| 380,983 | 4/1888 | Bleichert | 24/122.6 |
| 985,915 | 3/1911 | Marchand | 24/126 L |
| 1,857,436 | 5/1932 | Cole | 24/122.6 X |
| 1,886,247 | 11/1932 | Cole | 24/122.6 X |
| 1,885,316 | 11/1932 | Astley | 24/126 C X |
| 3,220,074 | 11/1965 | Ehmann | 24/122.6 |
| 3,254,383 | 6/1966 | Ehmann | 24/122.6 |
| 3,475,795 | 11/1969 | Youngblood | 24/126 L X |

FOREIGN PATENTS

| | | | |
|---|---|---|---|
| 14,869 | 12/1885 | Great Britain | 24/122.6 |

*Primary Examiner*—Charlie T. Moon
*Attorney*—Waters, Roditi, Schwartz & Nissen

ABSTRACT: The present method of securing the end of a spiral-lay wire rope in a tapered socket consists in simultaneous forcing of a set of conical rings with wedge-shaped spiral ribs between the layers of wires of the nonloosened end of the rope protruding from the socket with simultaneous clamping of the end of the rope around the perimeter and with subsequent squeezing it in the socket wherein the process of squeezing is effected with a force sufficient for attaining the yield point of the material of conical rings until said material fills the gaps between the wires.

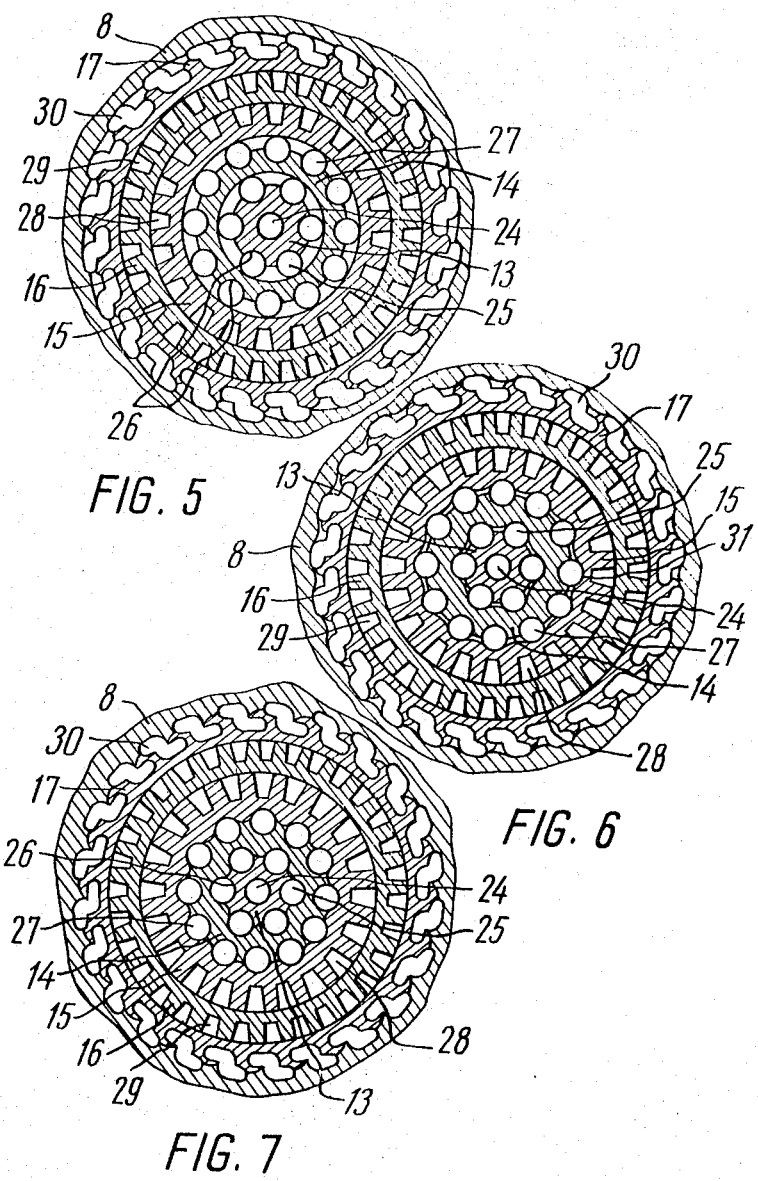

METHOD OF SECURING SPIRAL-LAY WIRE ROPES IN TAPERED SOCKET

The present invention relates to the methods of securing the wire ropes, mainly spiral-lay wire ropes which are terminated by wedging out their elements and squeezing them in a tapered socket and is used for securing the ends of the guy ropes of the booms of powerful walking excavators, dumping mechanisms, height compensators, load-carrying cables of hanging bridges, cableways and other structures utilizing spiral-lay wire ropes.

Known from an earlier patent application is a method of securing the end of a spiral-lay wire rope with the aid of a set of split concentric conical rings with wedge-shaped spiral ribs on the surface. The wire rope is terminated by the simultaneous insertion of said rings into the nonloosened end of the rope protruding from the socket, between the layers of its wires, concurrently with clamping the butt end of the rope around the perimeter, followed by squeezing its wedged end in the socket.

The above-described method involves a number of disadvantages, namely:

difficult orientation and holding of the split conical rings in their insertion mechanism;

irregular distribution of wires at the line of cut of the rings; development of corrosion centers when lubricant is removed from the wires contacting the wedges, and when hollows are formed between the wires.

Irregular distribution of wires in the rope causes overloading of individual wires which reduces the fatigue strength of the rope end attachment.

The rigidity of the rings leads to the concentration of stresses in the rope wires at the points where they are clamped by the rings, which localizes the destruction zone of the rope.

Vibrations occurring in operation lead to the displacement and slipping of the rope wires over the conical rings. This causes redistribution of loads on individual wires, and not always towards their equalization.

An object of the invention resides in ensuring the structural integrity of the rope under alternating loads at the point of socketing. For achieving the aforesaid objects we hereby propose a method of socketing spiral-lay wire ropes in a tapered socket with the aid of concentric conical rings with wedge-shaped spiral ribs on the surface wherein said conical rings are forced between the layers of the wires of the protruding end of the rope with simultaneous clamping of the rope butt end around the perimeter and subsequent squeezing of the rope end in the socket. After the conical rings have been forced in between the layers of the wires, the rope is squeezed in the tapered socket with a force sufficient for reaching the yield point of the material of the conical rings so that said material fills the spaces between the wires.

In an actual realization of the method, the conical rings with wedge-shaped spiral ribs on the surface are made solid and the yield point of their material is lower than that of the material of the wires.

The claimed method and the rings which are used for its realization and are made of a material whole yield point is lower than that of the wire material, make it possible to fill the spaces between the wires with the material of these rings during squeezing which protects the rope against the development of corrosion centers, fixes the position of the wires with relation the conical rings and reduces the concentration of stresses in the rope wires, thereby increasing the life of socketing.

Now the invention will be described by way of example with reference to the accompanying drawings in which:

FIG. 5 is a cross section of a wire rope with conical rings inserted between its wire coils;

FIG. 6 is a cross section of the same wire rope at the moment of its squeezing in a tapered socket;

FIG. 7 is a cross section of a wire rope after squeezing the socket.

Figure 1:
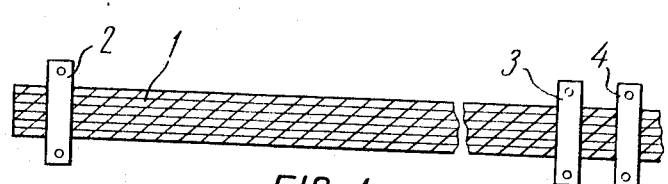
FIG. 1 shows a rope with clamps before the preparation for socketing.

Before beginning to secure the end of the wire rope 1 (FIG. 1), the entire length of the rope should be reeled off the drum (not shown) to make up for the displacement of the wire layers which displacement takes place at the moment of the rope winding.

Then clamps 2 and 3 (for example, in the form of two jaws bolted together) are installed on the rope at a distance which is equal to a required length of the rope and leaving about 100 mm. of the rope protruding beyond each clamp. An additional clamp 4 is placed at a distance of 50–100 mm. from the clamp 3 to prevent tousling of the remaining length of the rope. The clamps 2, 3 and 4 must be drawn up to the nominal diameter of a given size.

Figure 2:
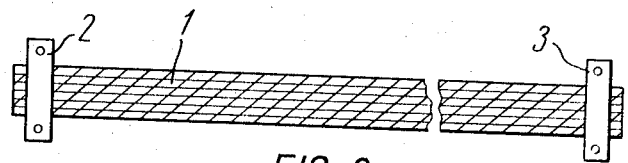
FIG. 2 shows a length of a rope with clamps at the ends thereof before securing these ends in sockets.

Then the rope 1 is cut off before the clamp 2 and between the clamps 3 and 4 as shown in FIG. 2 after which the ends of the rope are welded up so that the welded metal would not protrude beyond the rope diameter.

Figure 3:
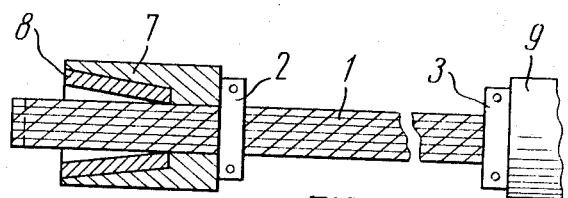
FIG. 3 shows a length of a rope with tapered sockets and clamps at the ends.

Then the clamps 2 and 3 are removed and installed on the rope 1 at a certain distance from the rope ends, this distance being a little greater (by 50 mm. as shown in FIG. 3), than the length of the tapered socket 7. Then the tapered socket is slipped on the end of the rope; said socket has a gasket 8 of a soft metal, for example, copper, on the tapered surface directed towards the rope.

Then the end of the rope 1 is fastened in the tapered socket 7, the socket 9 is slipped on, and the second end is fastened analogously to the first one.

On completion of the above-described operations, the rope 1 is secured in the holder 10 (FIG. 4) of the hydraulic grip (not shown) with the clamp 2 bearing against said holder 10. Then a flexible element 11 is placed on the welded end of the rope 1. To prevent the flexible element 11 from being displaced towards the tapered socket, a limiting washer 12 is installed between said element 11 and said socket 7.

The flexible element 11 is tensioned by the device (not shown) for squeezing the end of the rope, using a force sufficient for keeping the rope wires from turning of themselves. Then the butt end of the welded rope end is cut off with, say, a thin rubber-based abrasive wheel so as to break the connection of the rope wires with one another.

Meanwhile, the rope wires are clamped together, as stated above, by the flexible element 11.

The rope is wedged up by solid conical rings 13, 14, 15, 16 and 17 with wedge-shaped spiral ribs on the outer profiled surface said ribs being pointed in the front part, adapted for entering into the nonloosened end of the rope in a definite sequence, and made of a soft metal, for example, copper.

The rings 13, 14, 15, 16 and 17 are previously slipped on the holders (not shown) of the mechanism 18 for their insertion in a definite sequence, said mechanism being installed on the end of the rod 19 of a reversible hydraulic cylinder 20.

In the initial position the rings are extended in the following sequence: a central conical ring 13 and conical rings 14, 15, 16, 17.

Besides, articulated to the rod 19 are spring-loaded levers 21 with slanted surfaces 22 on the grips 23 for interacting with the tapered socket 7 during the working and reverse strokes.

The end of the rope 1 is secured in the socket 7 in the following manner.

As the rod 19 of the hydraulic cylinder 20 moves towards the rope 1 and approaches the butt end of the latter, the conical ring 13 is oriented by its holder (not shown) into the hole between the layer 24 (FIG. 5) of the central wire end and the layer 25 of wires.

During the further movement of the rod 19 of the hydraulic cylinder 20 the conical rings 13 enters between the wire of the layer 24 and the layer 24 of the wires, forcing apart these wire layers 24 and 25 by the ribs so that the wire layer 24 enters the ring 13 and the wires of the layer 25 are distributed between the grooves 26 between the adjacent ribs. As soon as the conical ring 14 approaches the butt end of the rope, it is oriented between the wire layers 25 and 27.

In the course of the further movement of the ring 14 into the rope said ring is opposed by the wire layers and the foremost conical ring 13 is stopped.

The wires of the layer 27 of the rope 1 are located in the grooves 26 of the ring 14.

The rings 15, 16 and 17 are set and oriented in the same manner.

As soon as the conical ring 17 is set in position, all the rings 13, 14, 15, 16 and 17 start moving simultaneously into the rope. During this movement the rings 13, 14, 15, 16, 17 turn on their holders independently of one another (holders not shown) around the longitudinal 16, of the rope 1 while entering their layers 24, 25, 27, 28, 29 and 30 over the wire lay pitches until they enter completely into the rope 1.

Figure 4:
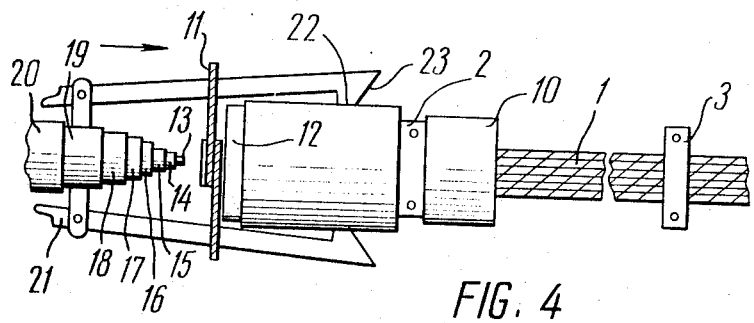
FIG. 4 shows a wire rope with its end socketed by the proposed method.

As the rod 19 moves together with the mechanism 18 for successive insertion of the rings 13, 14, 15, 16, 17 into the rope, the slanted surfaces 22 of the spring-loaded levers 21 come against the tapered socket 7, are forced apart and slide over the outer surface of said socket 7 (FIG. 4).

When the rings 13, 14, 15, 16, 17 enter completely into the rope, the levers 21 come together beyond the socket 7 and the grips 23 hold it in place.

Before squeezing, the flexible element 11 and the limiting washer 12 are discarded and the rope 1 at this moment is not pressed by the soft gasket 8 in the tapered socket 7.

When the rod 19 moves in the reverse directions the rings 13, 14, 15, 16, 17 come off the holders (not shown) and remain in the rope whereas the tapered socket 7 is moved by the levers 23, thus squeezing the rope 1.

When the rope 1 is squeezed with a force sufficient for reaching the yield point of the material of the rings 13, 14, 15, 16, 17, said rings undergo plastic deformation because their yield point is lower than that of the wires.

The material of the rings 13, 14, 15, 16, 17 and of the soft gasket 8 starts to flow, filling the gaps, compressing the lubricant and forcing out the air pockets from between the wires, thereby forming grooves 31 (FIG. 6) on the inner surface of the rings 13, 14, 15, 16 17 said grooves intersecting the outer ones. During the further squeezing, the material of the rings 13, 14, 15, 16, 17 forces out the lubricant and fills the gaps between the wires (FIG. 7) thus cold-filling the end of the rope 1 with metal in the socket 7. The other end of the rope 1 is secured in the socket 9 in the same manner.

We claim:

1. A method of securing the end of a spiral-lay wire rope in a tapered socket with the aid of a set of concentric conical rings with wedge-shaped spiral ribs on the surface, said method consisting of the following operations: simultaneous forcing of said conical rings between the layers of wires of the nonloosened end of the rope protruding from the socket, concurrently with clamping of the end of the rope around the perimeter and with subsequent squeezing of the end of the rope in said tapered socket with a force sufficient for attaining the yield point of the material of the conical rings until said material fills the gaps between the wires.

2. A method as claimed in claim 1 wherein said concentric conical rings with wedge-shaped spiral ribs are made of a solid metal whose yield point is lower than that of the material of the rope wires.

* * * * *